INVENTOR.
NATHANIEL BREWER
MICHAEL EVANENKO
BY
Leonard L. Kalish
attorney

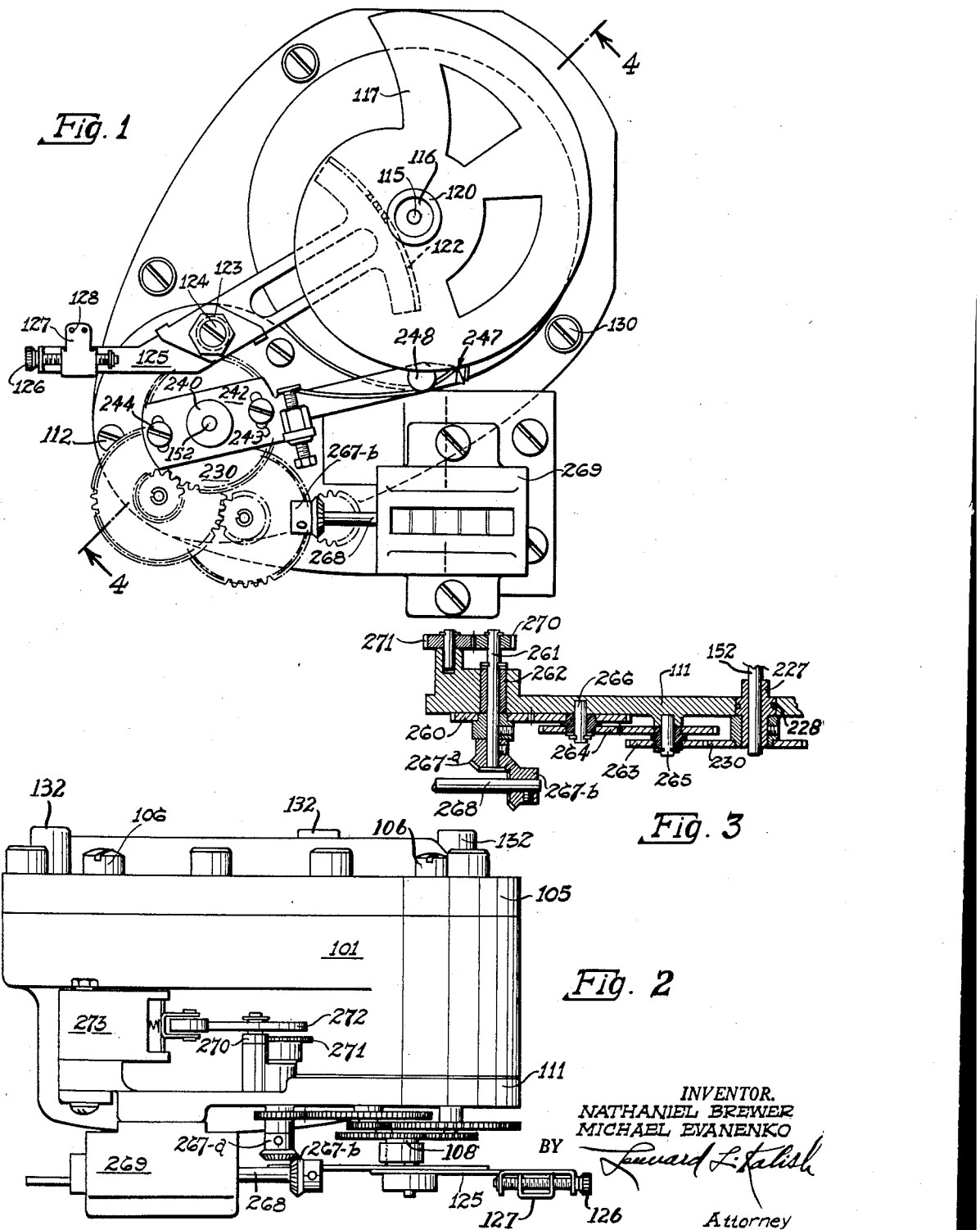

July 1, 1958 N. BREWER ET AL 2,841,330
MAGNETIC-CLUTCH INTEGRATOR
Filed Sept. 8, 1953 5 Sheets-Sheet 3
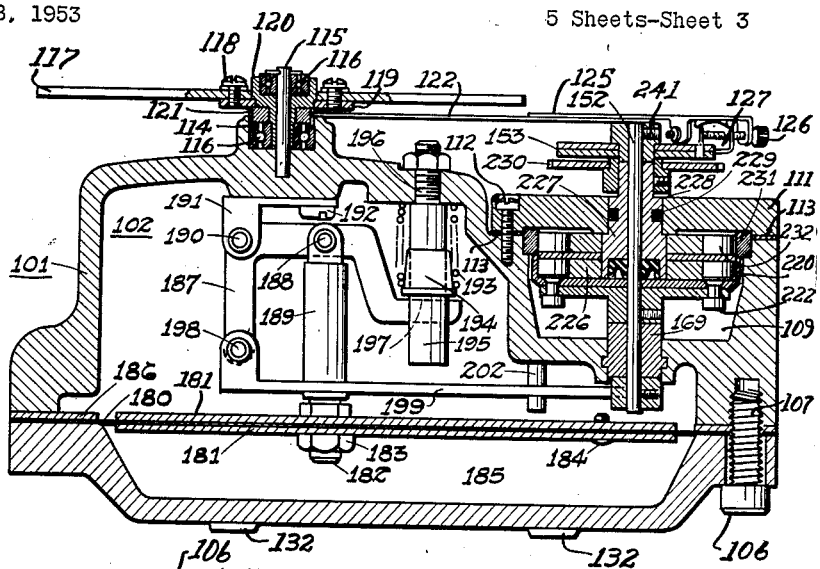
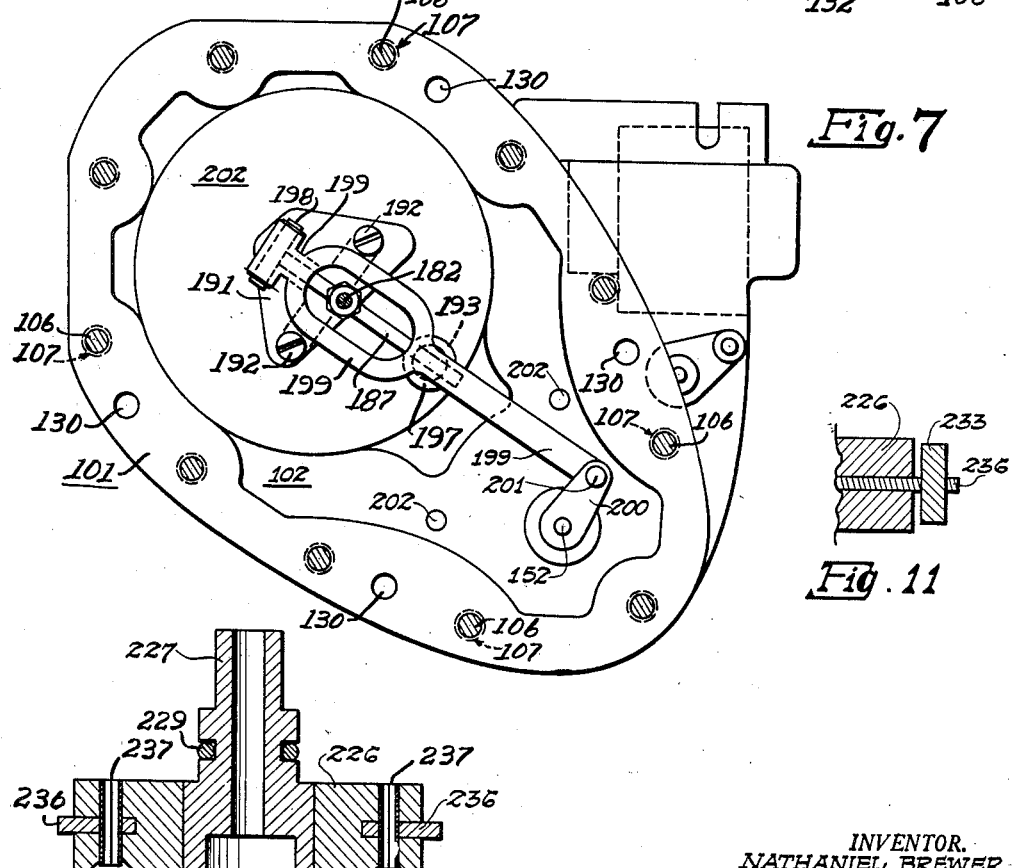
INVENTOR.
NATHANIEL BREWER
MICHAEL EVANENKO
BY
Leonard L. Kalish
Attorney

INVENTOR.
NATHANIEL BREWER
MICHAEL EVANENKO
BY

ATTORNEY.

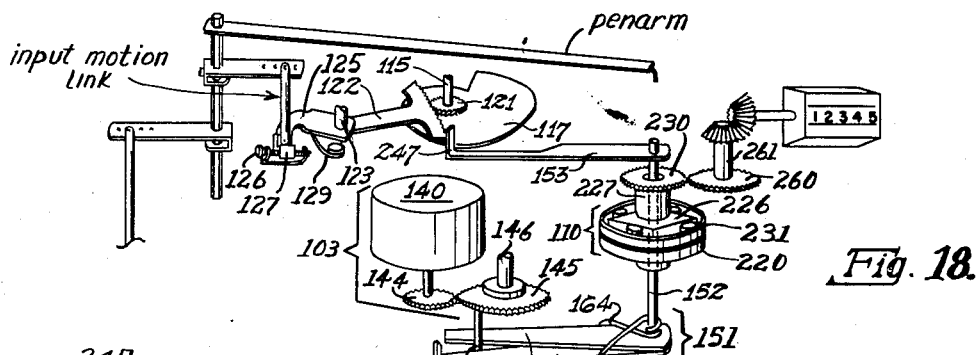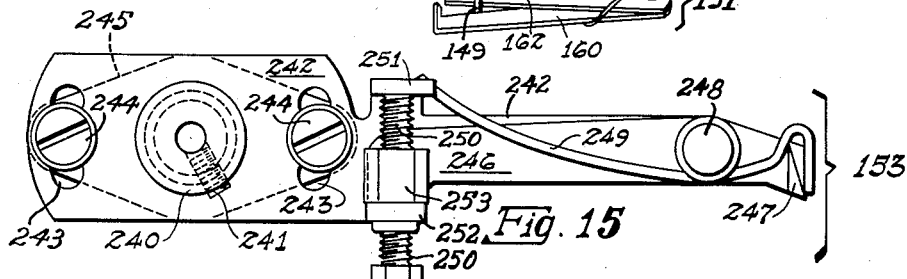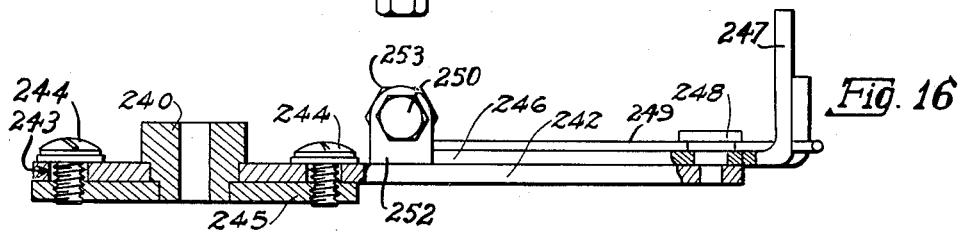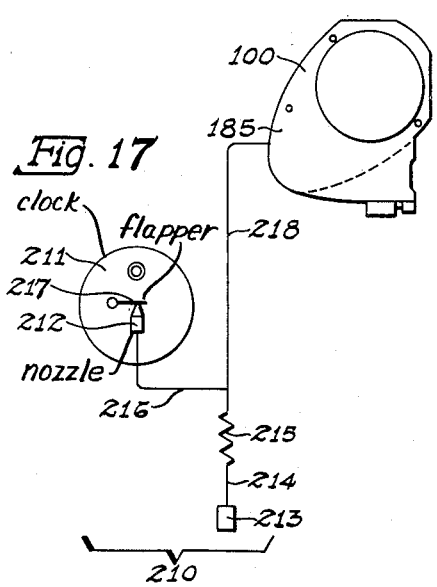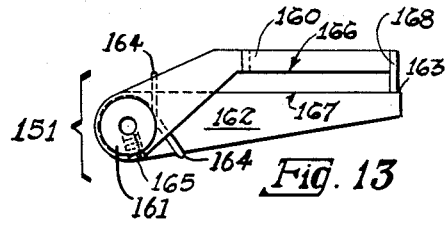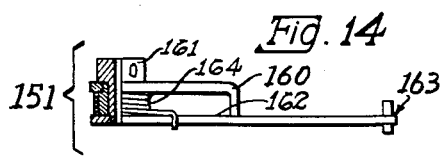

United States Patent Office 2,841,330
Patented July 1, 1958

2,841,330

MAGNETIC-CLUTCH INTEGRATOR

Nathaniel Brewer, Newtown, and Michael Evanesko, Sellersville, Pa., assignors to Fischer & Porter Company, Hatboro, Pa., a corporation of Pennsylvania Application September 8, 1953, Serial No. 378,944

4 Claims. (Cl. 235—61)

This invention is directed to a magnetic clutch integrator, and to a magnetic roller clutch.

It is advantageous to provide meters, such as rate-of-flow meters, with an integrator which sums up or totalizes the flow, namely the time-integral of the rate-of-flow, and shows this total on a mechanical or electrical counter which can be read at operating time-period intervals, such as daily, weekly, etc. intervals.

It is an object of this invention to provide an improved integrator for totalizing a plurality of input-movements, such as from a meter or the like.

It is another object of this invention to provide a new form of roller clutch which utilizes non-contacting magnets instead of springs, to cause wedging engagement of the rollers.

It is a further object of this invention to provide a magnetic clutch in which the magnets support the rollers during assembly, so they need not be touched.

It is also an object of this invention to provide a magnetic clutch structure which readily admits a total enclosure of the clutch and/or submergence in oil for protection from dirt and corrosive fumes.

It is a further object of this invention to provide an integrator which can be housed in a case of such dimensional symmetry as to permit mounting on either the right-hand or left-hand side of the instrument case, with the counter visible through the main door glass opening, just outside the instrument chart.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Figure 1 represents a front elevational view of a right-hand integrator embodying the present invention, this view being representative both of the electric-drive embodiment shown in Figures 4, 5 and 18 and of the pneumatic drive embodiment shown in Figures 6, 7 and 17.

Figure 2 represents a bottom view of the integrator of Figure 1; showing the counter gear-train and optional switch for the electric counter.

Figure 3 represents a cross-sectional view through the counter gear-train, laid out as if all gear axes were in the same plane.

Figure 6 represents a centerline section of a left-hand pneumatic drive integrator embodying the present invention.

Figure 7 represents a rear view of the integrator shown in Figure 6, with the back-cover removed.

Figure 10 represents a cross-corner section, at double-scale, of the double-clutch rotor-assembly, on line 10—10 of Figure 9.

Figure 11 represents a fragmentary section, at double-scale, through a magnet, as on line 11—11 of Figure 9.

Figure 13 represents a rear elevational view of the drive-crank assembly, for a right-hand integrator of the present invention.

Figure 14 represents a bottom view of the drive-crank assembly shown in Figure 13 partly in section.

Figure 15 represents a front elevational view at double-scale, of the cam-contact arm assembly for a right-hand integrator.

Figure 16 represents a bottom view of the same, at double scale, partly in section.

Figure 17 is a schematic representation of the air-supply system for a pneumatic integrator.

Figure 18 represents a schematic perspective view of the electric-drive embodiment of the integrator of the present invention.

Figure 4:
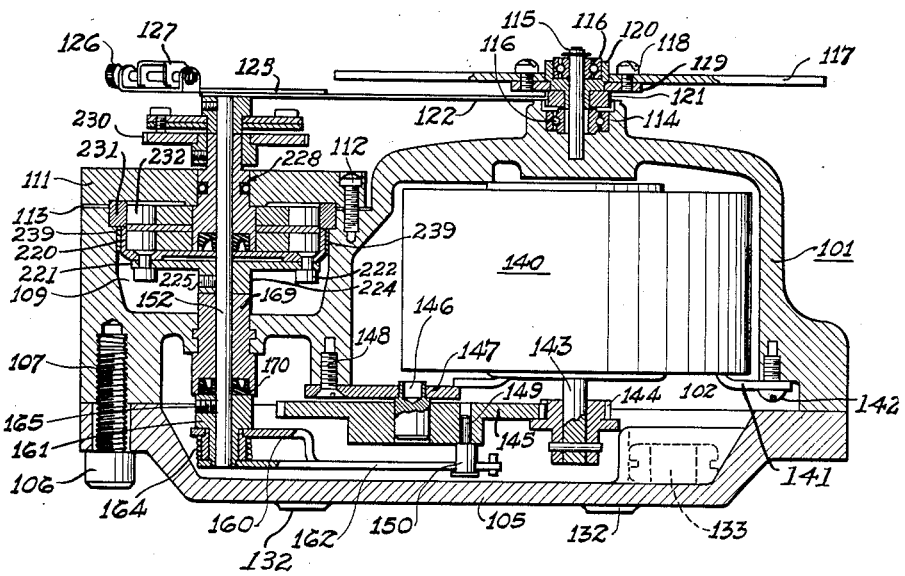
Figure 4 represents a centerline section through an electric-drive integrator representing one embodiment of the present invention taken on section-line 4—4 in Figure 1.

The integrator has a generally symmetrical double-cavity housing 101. Within the back-cavity 102 the electric drive assembly shown in Figures 4 and 5 or the pneumatic drive assembly shown in Figures 6 and 7 is disposed; enclosed by back-cover 105 held by the four screws 106 in the tapped holes 107. Within the front cavity 109, the oil-immersed double-roller clutch assembly 110 is disposed, enclosed by the front cover 111 which is fastened by the five screws 112 and sealed by the gasket 113.

Figure 5:
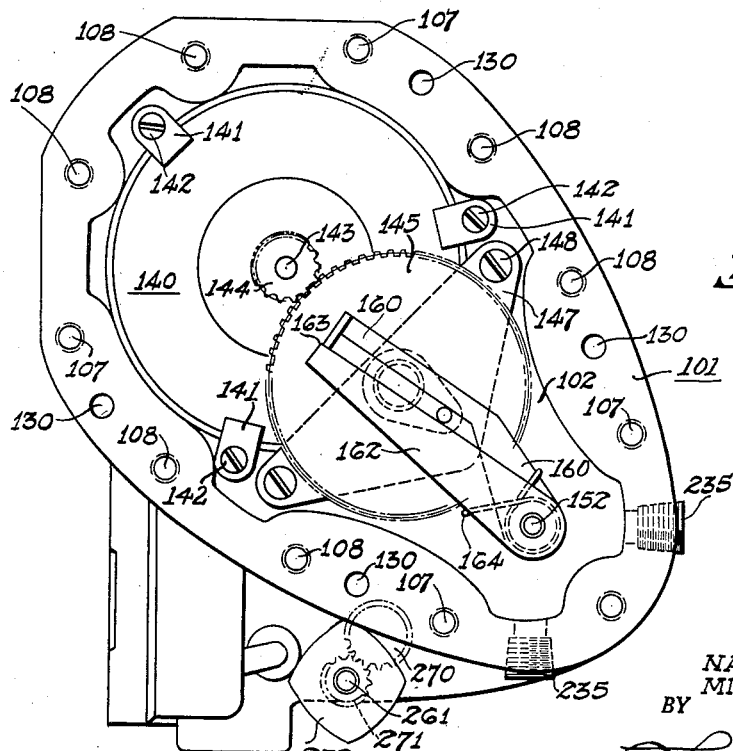
Figure 5 represents a rear view of the integrator shown in Figure 4, with the back-cover removed, showing motor and pinion, crank-gear, crank-pin and crank-arm inside the housing, and counter roller switch and cam outside.

Also on the front of 101 is cam bearing cavity 114 and central therein cam bearing pin 115 (Figures 4 and 6). Pivoted here on two ball bearings 116, retained by a snap-ring on pin 115, is spiral integrator cam 117 screwed at 118 to flange 119 on stepped hub 120, which also carries cam drive pinion 121. Meshing with 121 is cam drive sector 122, pivoted on eccentric mesh adjusting bushing 123, held by screw 124 on a boss 108 projecting from front cover 111. Also pivoted on 123 is sector drive arm 125 carrying micrometer radius adjustment 126 for slide 127 carrying link holes 128 for linking to the pen or pointer movement of a recording or indication instrument. Arm 125 is flexibly coupled to sector 122 by a double-action spring 129 shown in Figure 18 in such manner that 125 and 122 normally move as a unit, rotating cam 117 in proportion to the input motion at link hole 128, the sector to pinion multiplication in the embodiment shown being nearly nine-fold (other multiplication factors being permissible) in order to utilize most of the periphery of the large spiral cam 117. While cam 117 is clamped as described later, and hence sector 122 is restrained, lever 125 still can move in either direction by deflecting spring 129. End gear teeth of sector 122 are missing, forming stops against disengagement of the sector from pinion 121.

Four clearance holes 130 in 101 and mating holes 131 in cover 105 provide for four mounting screws, at upper right and left and at bottom inside in either right-hand or left-hand position in the instrument case, there being pads or feet 132 on 105 surrounding holes 131. In the rear cover 105 a through hole is provided into which an insulation grommet 133 (Figure 4) is snapped, to protect the wires leading to the synchronous motor 140 of a non-explosion-proof electric integrator. Alternatively, a tapped hole may be provided at 133 for a conduit connection to an explosion-proof integrator or for a pipe thread connection to a pneumatic integrator.

Figure 12:
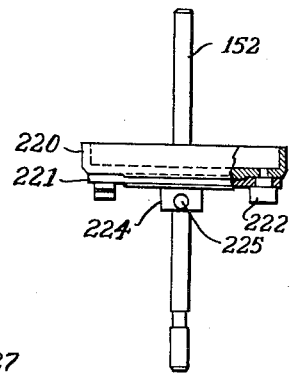
Figure 12 represents a top view of the input-shaft assembly.

Electric drive 103 consists of a slow-speed synchronous electric motor 140 held in the cavity 102 by three clips 141 fastened by screws 142. The output shaft 143 of this motor (which in the embodiment shown turns at 100 R. P. M. with 60 cycle A. C. supply) has a flanged pinion 144 whose 24 teeth drive a 100-tooth crank gear 145 pivoted on stud 146 riveted in the triangular plate 147 anchored in housing 101 by screws 148 (Figure 4). Crank gear 145 is retained on the pivot-pin 146 by the overlapping flange of motor pinion 144. Mounted eccentrically on crank gear 145 is crank pin 149, on which the roller 150 is mounted, retained by a washer and snapring. This crank-roller 150 operates on drive-arm assembly 151 of Figures 4, 5, 13 and 14, producing angular oscillation of clutch drive shaft assembly 152 of Figure 12 to an amount determined by the travel of cam contact arm assembly 153 of Figures 15 and 16 on the front end of shaft assembly 152 until 153 strikes the edge of integrator cam 117.

Drive arm assembly 151 consists of drive arm 160 pivoted on hub 161 to which is staked the follower arm 162, the two arms normally being held in contact at 163 by helical spring 164 engaging both of them. Hub 161 is anchored to clutch drive shaft 152 by set screw 165. The roller-contacting edge 166 of 160 is spaced from parallel opposed roller-contacting edge 167 of follower arm 162 just the diameter of roller 150, by turned-over tip 168 of 160. Left-hand drive arm assembly is made with a left-hand drive arm having bends in the opposite direction.

If calibrated spiral cam 117 is turned so its minimum radius is in line with the arc of tip 247 of contact arm 153, crank roller 150 operating in "slot" 166—167 oscillates 151 as a unit, and contact arm 153 just touches cam 117 at each stroke, as crank roller 150 passes dead center on 166. At greater cam radii, contact arm 153 strikes earlier, before roller 150 reaches dead center on 166, stopping the travel of clutch drive shaft 152 at that fraction of full stroke corresponding to the fraction of rise on spiral cam 117 up to the point of contact. Meanwhile motor 140 and crank gear 145 continue to turn, and roller 150 operating against edge 166 lifts arm 160, against the torque of spring 164, away from follower arm 162 while it and hub 161 remain at the stopped position. As roller 150 continues past dead center, it lowers 160 toward 162 until it contacts again at 163, and motion of assembly 151 continues as a unit for the rest of the cycle.

As the bearing 169 for shaft 152 as well as the crank gear 145 and its bearing stud 146 lie in the bottom of the cavity 102 in either right-hand or left-hand mounting, it is possible to submerse these parts in a light adhesive grease, providing lubrication without the level being high enough for grease softened by motor heat to run into the motor and affect its windings. Seal 170 keeps grease out of bearing 169, at the same time retaining thin oil in the bearing and clutch cavity 109.

The pneumatic drive shown in Figures 6, 7 and 17, alternatively contained in cavity 102, and driven by timed pneumatic impulses, consists of diaphragm 180 reinforced by ovoid plates 181 clamped by stud 182 and nuts 183 and also by screw 184, and forming an airtight cavity 185 between itself and cover 105. A spacer plate 186 mounted between diaphragm 180 and housing 101, containing an aperture slightly larger than the outline of diaphragm reenforcing plates 181, provides regular support for the diaphragm and avoids wrinkling and over-stressing which would occur if the diaphragm operated against the irregular outline of the cavity 102. Pneumatic pulses flex diaphragm 180 and drive bell-crank 187 at pivot pin 188 through push rod 189 which has a ball and socket connection to stud 182. Bell crank 187 is pivoted at 190 in bracket 191 screwed at 192 to the inside front of cavity 102. Forward motion of the diaphragm assembly is opposed by spring 193 acting through follower sleeve 194 guided on slotted stud 195 anchored at 196 and carrying rocker plate 197 acting against the end of the bell crank 187. This spring powers the measuring strokes, expelling the air from cavity 185 between pulses and returning diaphragm 180 toward the start of its stroke. A hole in the lower front of 101 allows a breathing of cavity 102.

The other end of bell crank 187, directly in back of pivot pin 190 is connected by pin 198 to connecting rod 199 which drives crank 200 on shaft 152, on through pin 201. Thus each stroke of diaphragm 180, through this linkage, causes one oscillation of crank 200 and clutch drive shaft 152, just as one revolution of motor-driven crank gear 145 caused one oscillation of the same shaft. In the right-hand assembly, the orientation of bracket 190 places connecting rod 199 on the opposite side of shaft 152.

The limits of motion of 180 are determined in the backward or depressuring or sensing direction by cam contact arm assembly 153 striking the edge of cam 117, and in the forward or pressuring direction by front diaphragm plate 181 striking two stop pins 202, pressed into body 101, at the same time that push rod 189 strikes bracket 191, thus giving a positive motion limit and three-point support to plate 181 in the pressure direction.

Timed pneumatic pulses for operating the pneumatic drive may be obtained from the system 210 shown schematically in Figure 17. Attached to chart-drive or electric-clock 211, in the same instrument case, nozzle 212 (similar to a pneumatic controller nozzle) receives regulated (17 p. s. i.) air supply from source 213 through line 214, capillary restriction tube 215 (similar to a controller nozzle supply restriction) and nozzle line 216. Nozzle 212 has considerably greater air capacity than restriction 215. Flapper valve 217 is operated, preferably several times a minute, by a cam on one spindle of the chart-drive, 211. Alternately, this flapper closes, forcing air to flow through line 218 to diaphragm chamber 185, pressuring it, and then opens, venting both air incoming through restriction 215 and the air accumulated in diaphragm chamber 185. The flapper or equivalent timing valve, may be operated from any convenient timing source, as a spring, pneumatic or electric clock, or just a synchronous electric motor and cam. In some installations one pneumatic pulse-source may operate a number of integrators, as well as many pneumatic-pulse chart-drives.

Having thus arrived at regular strokes of cam-contact or sensing arm 153 measuring varying angles depending upon cam position at the moment, it is now necessary to sum these individual angles by action of roller clutch assembly 110, to secure a counter rotation proportional to total flow or other quantity measured over the given time interval.

Drive shaft 152, turning in bearing 169, in housing 101, has drive cup 220 fastened on disc 221 by attachment means such as rivets 222. Disc 221 is in turn fixed to shaft 152 by hub 224 integral with 222 and set screw 225 (see Figure 12).

Figure 9:
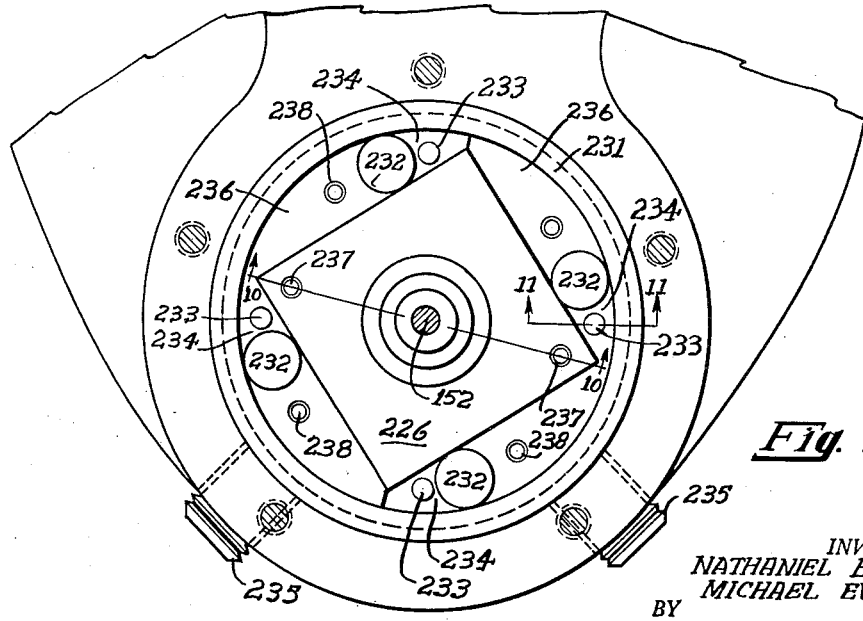
Figure 9 represents a front elevational view at double-scale of the roller-clutch assembly, as seen when the front-cover is removed.

When sensing arm 153 is lifted toward the cam 117 from the outer or zero cam radius, counterclockwise rotation of shaft 152 and cup 220 locks the rear roller-clutch of the clutch-assembly 110 of Figures 4, 6 and 9, driving square hub 226 and its quill shaft 227 counterclockwise. Quill shaft 227 has a bearing at 228 in front cover 111, sealed by O ring 229, and carries first gear 230 of the counter gear train of Figure 3. On the return stroke of arm 153, the rear clutch releases while the front clutch locks in stationary ring 231, preventing any loss of accumulated motion. Although the two clutches are identical, the front one is driven by the hub, instead of by the outer cup, so the locking direction is reversed. Operation of these roller clutches is effected by magnets. This is shown in detail for the front clutch in Figure 9. Hardened magnetic rollers 232 (such as, for instance, of 17-4PH stainless steel) are pulled by permanent magnets 233 into the wedge-shaped ends of spaces 234 between non-magnetic stainless steel square hub 226 and non-magnetic stainless steel stationary ring 231, and the slightest clockwise rotation locks the clutch solidly. Yet hub 226 can turn freely in a counter-clockwise direction with only the slightest friction from the rollers being drawn by the magnets against surface of ring 231, oil-soaked by reason of clutch chamber 109 being half full of thin oil. Two threaded plugs 235 serve as a filler and level plug, and as an oil drain plug, the functions being interchanged in right and left mounting positions.

The clutch construction is peculiarly economical in that double hub 226 for the front and back clutches, is made from one piece of square stock, grooved in the center (Figure 10) to fit and carry a partition comprising two brass spacer half-rings 236 each carrying two magnets 233 (Figures 9 and 11) staked in place. Half-rings 236 are each held in place in hub 226 by an expansion pin or roll-pin 237. Four other roll-pins 238 serve as stops for rollers 232. Without these stops a shipping shock might carry a roller away from its magnet and into the field of the magnet beyond the opposite end of sector-shaped roller cavity 234, locking the clutch in both directions.

The figures show a right-hand clutch. Left-hand clutches differ only in half-rings 236 being assembled with opposite side forward, placing magnets 233 a few degrees clockwise of the positions shown in Figure 9, just to the right of adjacent corners of hub 226.

To assemble the magnetic double-clutch, the eight rollers 232 are stuck to four magnets 233, and the rotor assembly is lowered into clutch chamber 109 with slight turning to cause rollers to enter stationary ring 231 and drive cup 220.

Cam 117, cut in a uniform spiral to fit uniform flow scale rate of flow meters, may be cut in other curves to fit other flow measuring elements or other measurements, some of which are highly non-linear and require steep rises. For example, in common orifice meters, flow is approximately proportional to the square of measuring element motion, and in V-notch weirs the factor is the 5/2 power. To avoid pressure from cam contact arm 153 causing forced rotation of such a steep cam, and thus error and wear, the edge of cam 117 is finely serrated with file-like teeth parallel to its axis.

Since cam 117 must be completely released during each cycle to permit it to take a new position if need be, and this release must take place even with cam at maximum radius (zero measurement) position, contact arm 153 must travel a little more than the stroke corresponding to full measurement range, yet the additional or clearance portion of the stroke must not be counted. This is accomplished by shoulder rivets 222 holding driving cup 220 to disc 221 being slightly smaller than the holes in disc 221, allowing a small amount of free angular rotation or shake corresponding to the additional uncounted travel desired. Ring-shaped brake spring 239 operating between cup 220 and housing cavity 109 retards cup motion in either direction so that full free motion is taken at each stroke before driving motion of the clutch begins. By this device it is necessary only to adjust precisely the lift of contact arm 153 from cam 117 to get correct counting over the entire scale, including no counting on zero. The shake between rivets 222 and disc 221 then matches and offsets the excess arm travel.

Figure 8:
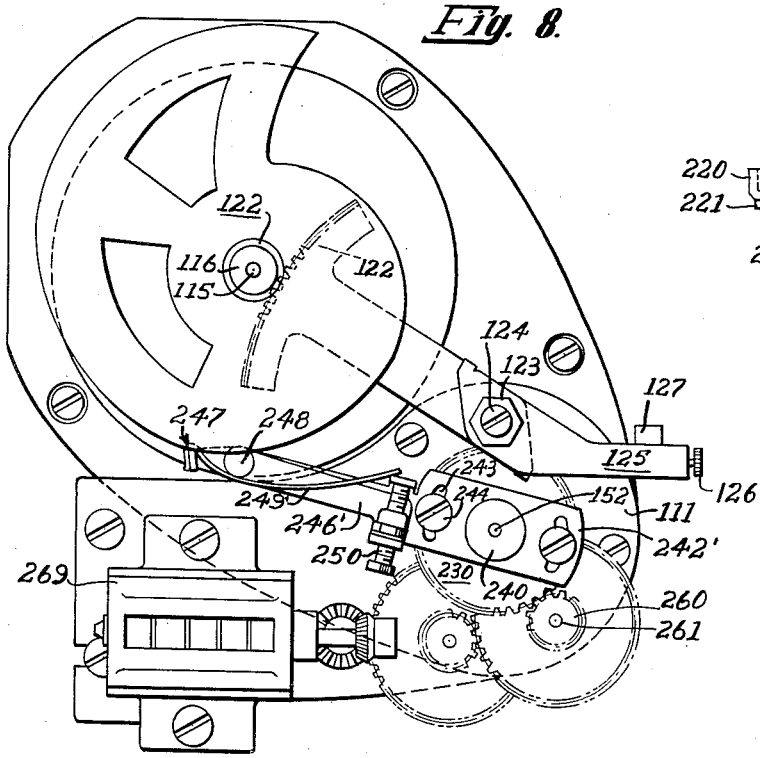
Figure 8 represents a front elevational view of a left-hand integrator embodying the present invention, this view being representative both of the electric-drive embodiment shown in Figures 4, 5 and 18 and of the pneumatic-drive embodiment shown in Figures 6, 7 and 17.

Cam contact arm 153 (Figures 15 and 16) includes a hub 240 with set screw 241 engaging a flat on the front end of shaft assembly 152. Pivoted on intermediate diameter of hub 240 is main lever 242 containing two sector slots 243 through which clamping screws 244 engage a double tapped hub extension 245 staked to small diameter of hub 240, thus providing a rough angular adjustment between the position of set screw 241 and main lever 242. As a fine adjustment, the contact lever 246 with V-edged tip 247 at right angles to body of 246 and to plane of cam 117, is pivoted on shoulder rivet 248 staked in main lever 242. A wire spring 249 holds adjusting screw 250 on 246 in clockwise engagement with ear 251 on main lever 242. An ear 252 turned up from 246 in line with 251 has riveted into it a self-locking nut 253 carrying screw 250 which adjusts the angular relationship between lever 246 and lever 242, and thus very gradually varies the angle between a radius from hub 240 to knife-edge 247 and shaft 152. Left-hand contact arm assembly 153' (Figure 8) differs only in having bends in 242' and 246' made in the opposite direction.

The counter train carried on cover 111 consists of input gear 230 on quill shaft 227 driving pinion 260 on mitre gear shaft 261, carried in bearing 262 in extension of cover 111, through double idler gears 263 and 264 held by snap rings on stub shafts 265 and 266 pressed into cover 111. Mitre gears 267–a and 267–b on shaft 261 and counter shaft 268 drive counter 269 in 1:1 ratio. Optionally, in the rear of cover 111, pinion 270 on mitre shaft 261 drives cam gear 271 and attached switch cam 272 (Figure 2), the ratios being so chosen that roller switch 273 makes one contact for each 1/10 turn, or each count of counter 269. Thereby a remote magnetic counter may be operated by switch 273 in synchronism with or instead of the mechanical counter 269 on the integrator.

The four centers for 227, 265, 266 and 261 in this counter gear train are in fixed locations, spaced 108 pitch of a 64-pitch gear. The gears of each pair are selected to total 108 teeth, but a very wide choice of gears are available within these limits, and almost any desired ratio between the quill shaft and the counter shaft may be secured. In one commercial embodiment 11 gears with tooth counts of 28, 36, 44, 48, 52, 56, 54, 60, 64, 72, and 80 teeth are used, in a series of assemblies giving counts ranging from 51.4 per hour to 1953.6 per hour at 100% stroke with a 60-cycle 100-R. P. M drive motor. This range of counts is secured in 90 steps a few percent apart. Intermediate values for any desired instrument calibration are secured by adjustment of micrometer 126 on the sector drive lever 125 so that full scale pen travel drives spiral cam 117 a little more or a little less than the nominal angle determined by the gear ratio between the sector 122 and the cam pinion 121. Very high rates of count are useful on batch metering work, while middle ranges of count are desirable on industrial meters read every day, and lower ranges of count are for meters which are read weekly or monthly. With 50-cycle power supply, synchronous motor 140 operates at 5/6 of the 60-cycle speed, and with 25 cycles at 5/12 of this speed, the number of integrator counts being reduced accordingly. As it does not seem practical to operate pneumatic drive as rapidly as 24 strokes per minute, a standard speed of 8 strokes is to be preferred, and the pneumatic drive integrator counts 1/3 as fast as a 60-cycle electric drive.

In order to keep the number of gear train parts to a minimum, in spite of the very wide range of speeds, all gears have the same hub bore. Where frequent count change may be required, as on certain batch mixing applications, double idlers may be snap ring held assemblies, instead of pressed assemblies as shown.

The present invention may be embodied in other specific forms without departing from the spirit or essential attributes thereof, and it is therefore desired that the present embodiments be considered in all respects as illustrative and not restrictive, reference being had to the appointed claims rather than to the foregoing description to indicate the scope of the invention.

Having thus described our invention, we claim as new and desire to protect by Letters Patent:

1. An integrator including a housing having a timer-chamber and a clutch-chamber therein completely partitioned from each other, closure means for said chambers, a measurement-sensing shaft extending through said clutch-chamber into said timing-chamber, a timer in said timing-chamber, means intermediate said timer and said measurement-sensing shaft for rotationally oscillating said shaft at timed intervals, a spiral measurement-cam revolvably mounted on said housing exteriorly thereof, a measurement-sensing cam-contacting arm carried by said measurement-sensing shaft in operative juxtaposition to said measurement-cam, a driving clutch-member and a driven clutch member within said clutch-chamber, floating coupling members intermediate said driving and driven clutch-members, said driving clutch member being fixedly connected to said measurement-sensing shaft, a driven shaft extending from said driven clutch-member, and a counter carried by said housing geared to said driven shaft.

2. An integrator including a housing having a timer-chamber and a clutch-chamber therein completely partitioned from each other, closure means for said chambers, a measurement-sensing shaft extending through said clutch-chamber into said timing-chamber, a timer in said timing-chamber, means intermediate said timer and said measurement-sensing shaft for rotationally oscillating said shaft at timed intervals, a spiral measurement-cam revolvably mounted on said housing exteriorly thereof, and having a serrated cam surface, a measurement-sensing cam-contacting arm carried by said measurement-sensing shaft in operative juxtaposition to said measurement-cam and having a cam-contacting portion adapted lockingly to engage said serrations of said cam, a driving clutch-member and a driven clutch member within said clutch-chamber, floating coupling members intermediate said driving and driven clutch members, said driving clutch member being fixedly connected to said measurement-sensing shaft, a driven shaft extending from said driven clutch member, and a counter carried by said housing geared to said driven shaft.

3. An integrator including a housing having a timer-chamber and a clutch-chamber therein, said housing being generally symmetrical about a median plane common to said two chambers, said chambers being completely separated from each other within said housing, one of said chambers opening on the front of said housing and the other of said chambers opening on the back of said housing, closures detachably secured to the front and back of said housing, closing said chambers, a measurement-sensing shaft extending through said clutch-chamber with one end thereof extending through the terminal wall thereof and into said timer-chamber and with the other end thereof extending through said detachable closure of said chamber, a timer in said timing-chamber, means intermediate said timer and said measurement-sensing shaft for rotationally oscillating said shaft at timed intervals, a spiral measurement-cam revolvably mounted on said housing exteriorly thereof, a measurement-sensing cam-contacting arm carried by said measurement-sensing shaft in operative juxtaposition to said measurement-cam, a driving and a driven clutch member within said clutch-chamber, coupling members intermediate said driving and driven clutch members, said driving clutch member being fixedly connected to said measurement-sensing shaft, a driven shaft extending from said driven clutch member through the detachable closure of said clutch-chamber, a counter carried by said closure geared to said driven shaft.

4. A clutch and brake including a revolvable driven member having axially offset drive and brake portions, a co-axial stationary brake member and a co-axial revolvable driving member in axially offset relation to each other surrounding the corresponding portions of said driven member and forming therewith tapered chambers for the reception of floating coupling members, said chambers being tapered in the same direction, a partition separating said chambers into the brake and drive portions, respectively, said partition comprising a pair of non-magnetic half-rings secured to said driven member, magnetically-attractable floating coupling members within said chambers adapted frictionally to couple said driven member to said driving member and to said brake member, respectively, and permanent magnets carried by said partition in operative juxtaposition to said floating coupling members, attracting them towards the small ends of said tapered chambers.

References Cited in the file of this patent

UNITED STATES PATENTS

| | | |
|---|---|---|
| 1,424,542 | Williams | Aug. 1, 1922 |
| 1,692,130 | Long et al. | Nov. 20, 1928 |
| 1,719,613 | Kohler | July 2, 1929 |
| 2,093,151 | McLean | Sept. 14, 1937 |
| 2,121,082 | Harrison | June 21, 1938 |
| 2,264,370 | Harrison | Dec. 2, 1941 |
| 2,300,223 | Hottenroth | Oct. 27, 1942 |
| 2,360,075 | Schoij | Oct. 10, 1944 |
| 2,398,261 | Stone | Apr. 9, 1946 |
| 2,480,677 | Sheffield | Aug. 30, 1949 |